United States Patent [19]
Burris

[11] Patent Number: 6,013,189
[45] Date of Patent: Jan. 11, 2000

[54] VENTED BATCH LIQUID PURIFIER

[76] Inventor: William Alan Burris, 7 E. Jefferson Cir., Pittsford, N.Y. 14534

[21] Appl. No.: 09/004,903

[22] Filed: Jan. 9, 1998

[51] Int. Cl.[7] ........................................ C02F 1/78
[52] U.S. Cl. .................. 210/750; 210/760; 210/765; 210/95; 210/117; 210/120; 210/136; 210/188; 210/192; 210/205; 210/218; 222/146.6
[58] Field of Search ................ 210/85, 95, 117, 210/120, 136, 188, 192, 205, 218, 750, 760, 765; 222/146.6

[56] References Cited

U.S. PATENT DOCUMENTS

| | | | |
|---|---|---|---|
| 4,256,574 | 3/1981 | Bhargava | 210/760 |
| 5,042,689 | 8/1991 | Mrugala et al. | 222/146.1 |
| 5,179,982 | 1/1993 | Bérubé et al. | 141/20 |
| 5,207,993 | 5/1993 | Burris . | |
| 5,333,660 | 8/1994 | Kohlmann et al. | 141/263 |
| 5,422,043 | 6/1995 | Burris . | |
| 5,531,908 | 7/1996 | Matsumoto et al. | 210/760 |
| 5,582,717 | 12/1996 | Di Santo | 210/192 |
| 5,711,461 | 1/1998 | Foster et al. | 222/383.1 |
| 5,711,887 | 1/1998 | Gastman et al. | 210/750 |
| 5,824,243 | 10/1998 | Contreras | 210/760 |

*Primary Examiner*—Peter A. Hruskoci
*Assistant Examiner*—Betsey J. Morrison
*Attorney, Agent, or Firm*—Eugene Stephens & Associates

[57] ABSTRACT

A purifier for a batch of liquid in a reservoir has a vent space and a pumping system for the vent space above the surface of liquid in the reservoir. This allows a closure lid giving easy access to the reservoir, and the pumping system is arranged so that ozone is exhausted from the vent space and reduced before entering the atmosphere. This allows a user early access to the reservoir after completing a purification cycle and protects the user from exposure to ozone.

71 Claims, 5 Drawing Sheets

VENTED BATCH LIQUID PURIFIER

TECHNICAL FIELD

Ozone purification of small batches of liquid with countertop sized equipment.

BACKGROUND

This invention advances from my previous U.S. Pat. No. 5,207,993, entitled Batch Liquid Purifier. It addresses and solves problems involved in the reliable purification by ozone treatment of small batches of liquid, such as required for household purification of water, for example. The problems include: ensuring that no liquid evades ozone treatment, making the ozone treatment reliable for purifying the liquid, informing the user that the purifier is operating properly, preventing ozone from escaping in any harmful quantity, ensuring that the purifier operates consistently and effectively without harm to itself or the user, and accomplishing these and related goals at a reasonably low manufacturing cost in a purifier that operates conveniently.

SUMMARY OF THE INVENTION

I have improved upon a reservoir type of batch liquid purifier by adding a vent space above the liquid surface in the reservoir and a venting pumping system that exhausts ozone-containing gas from the vent space. This provides a way of clearing ozone from the vent space quicker after purification is completed so that the reservoir can be opened. This in turn allows the reservoir to have a lid-covered covered access opening that allows cleaning and refilling.

There are several ways a vent pumping system can be arranged, including an upstream pump positively pressurizing the vent space and a downstream pump negatively pressurizing the vent space; and downstream pump versions can use tightly sealed vent spaces or vent spaces that admit air to dilute a concentration of ozone.

The vent pumping system also cooperates with other purifier features such as circulating filtered flow of liquid during purification, timing and indicating of the purifying and venting functions, and allowing illumination of a lid-accessible reservoir to observe rising gas bubbles during purification. My improvement also includes safety and convenience features, allowing the purifier to operate reliably without harm to itself or the user.

DRAWINGS

DETAILED DESCRIPTION

Figure 1:
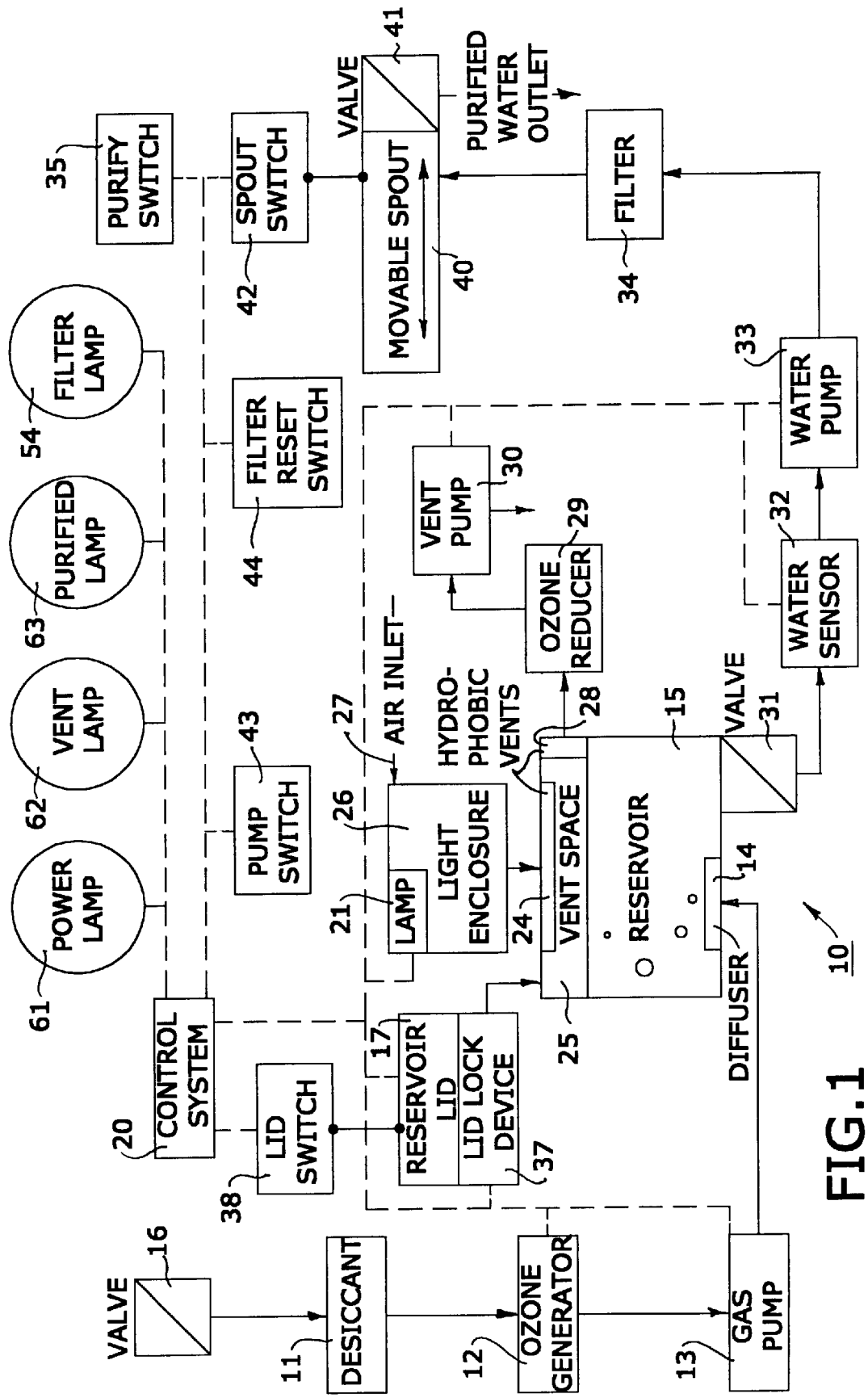
FIGS. 1–3 are schematic diagrams of preferred embodiments of the inventive purifier having many components in common and differing primarily in ways of operating a pumping system for a reservoir vent space.

The preferred embodiments of the drawings have comparative advantages in features such as convenience, reliability, safety, cost, and compactness. Different embodiments, using different combinations of such features, may be preferred for different users with different desires. Also, some of the different features that are illustrated in the drawings can be interchanged among the various embodiments, and the drawings are arranged to illustrate the different features that can be combined and not to delimit one combination of features from another.

The invention will first be explained relative to the embodiment illustrated in FIG. 1, and the description will follow the flows of liquid and ozone-containing gas in the purification process. This will reveal aspects of the invention in an order that is understandable but differs from the order of importance of the features involved.

First, the purification process applies to a small liquid batch sized for treatment in a purifier that can stand on a countertop, for example. A typical example to which the invention is not limited is purifying a small batch of water for household usage. Other liquids can also be purified for other purposes, but the description of the invention will assume that water is being purified.

Figure 2:
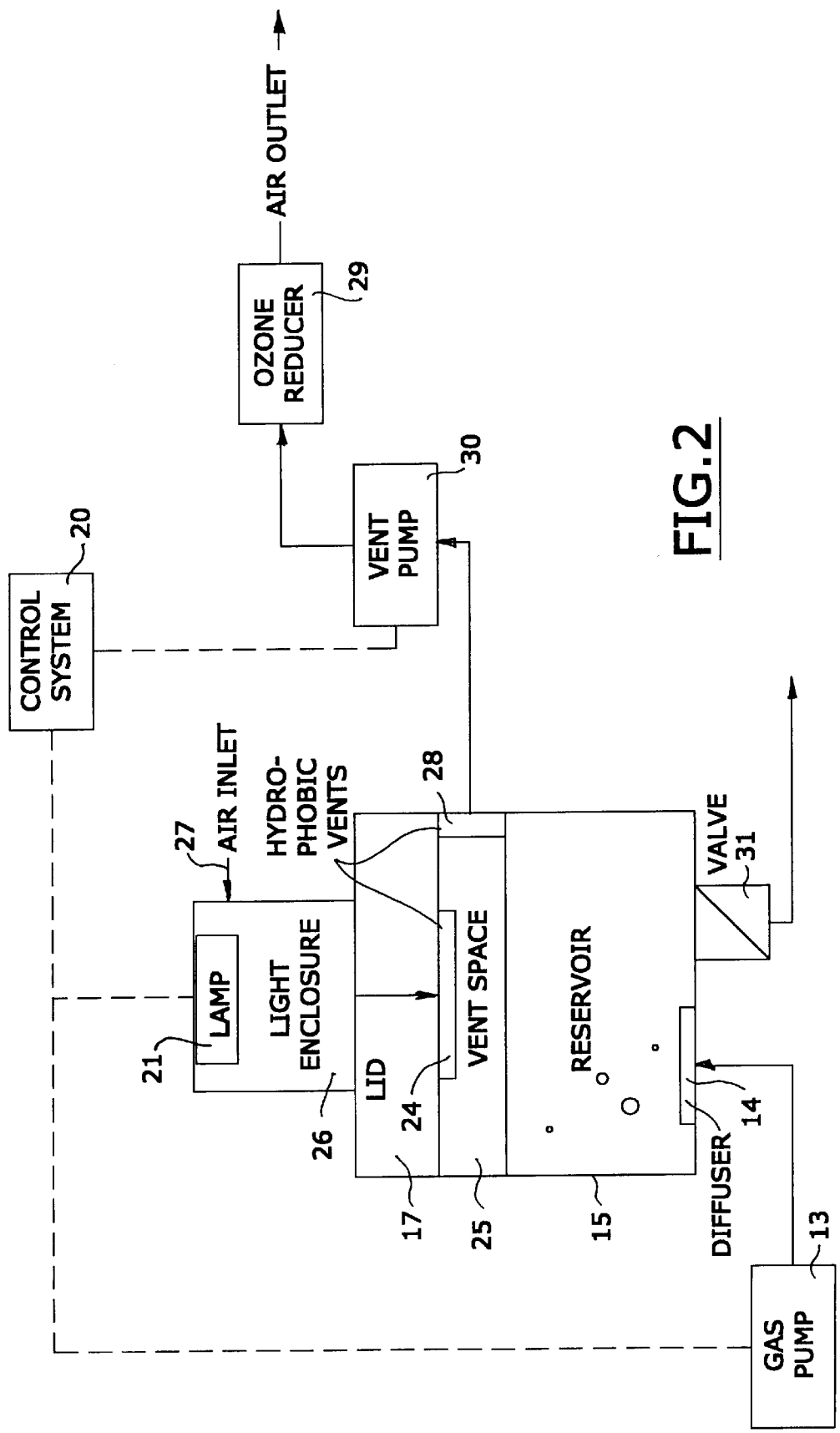
Figure 3:
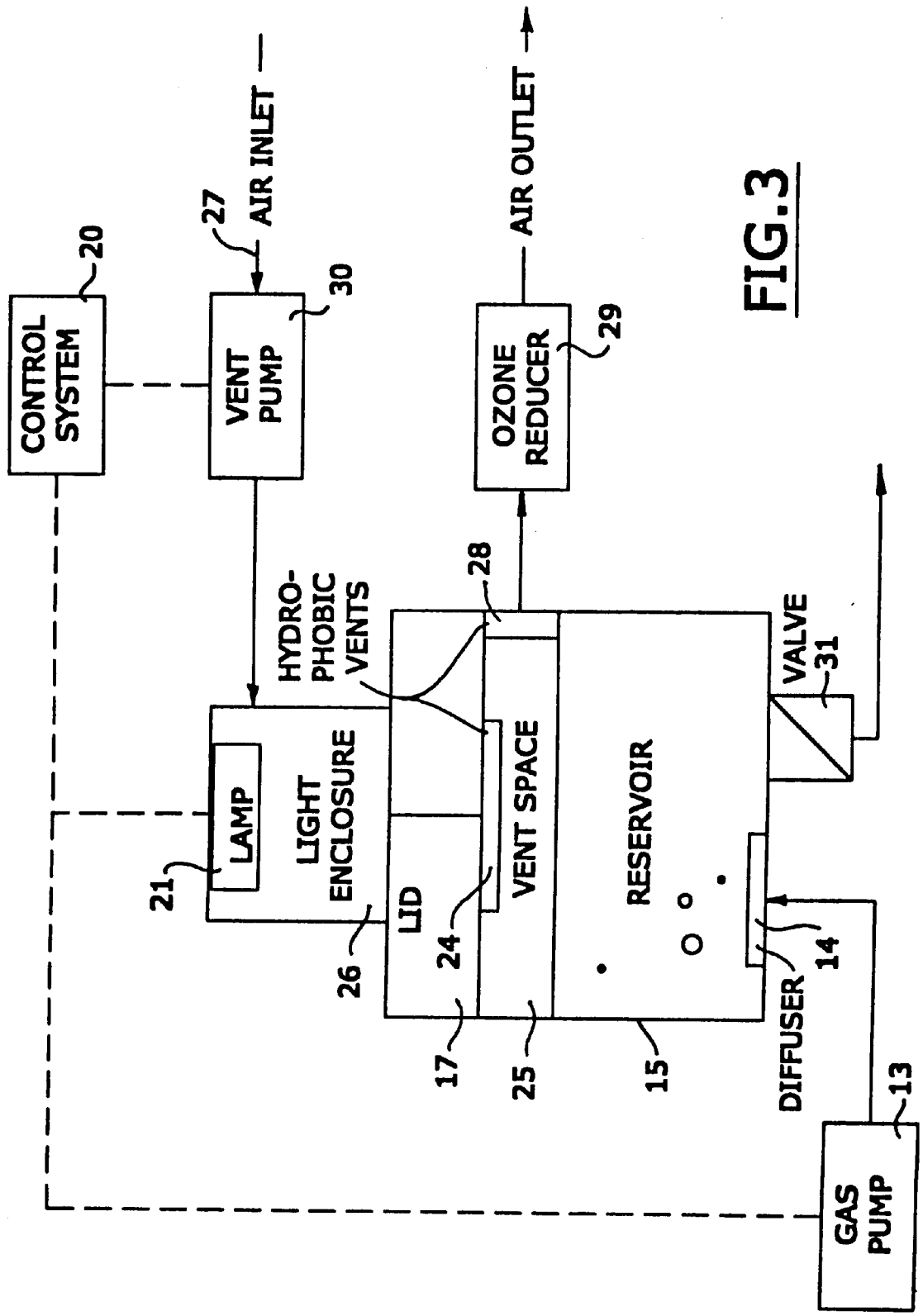
Figure 4:
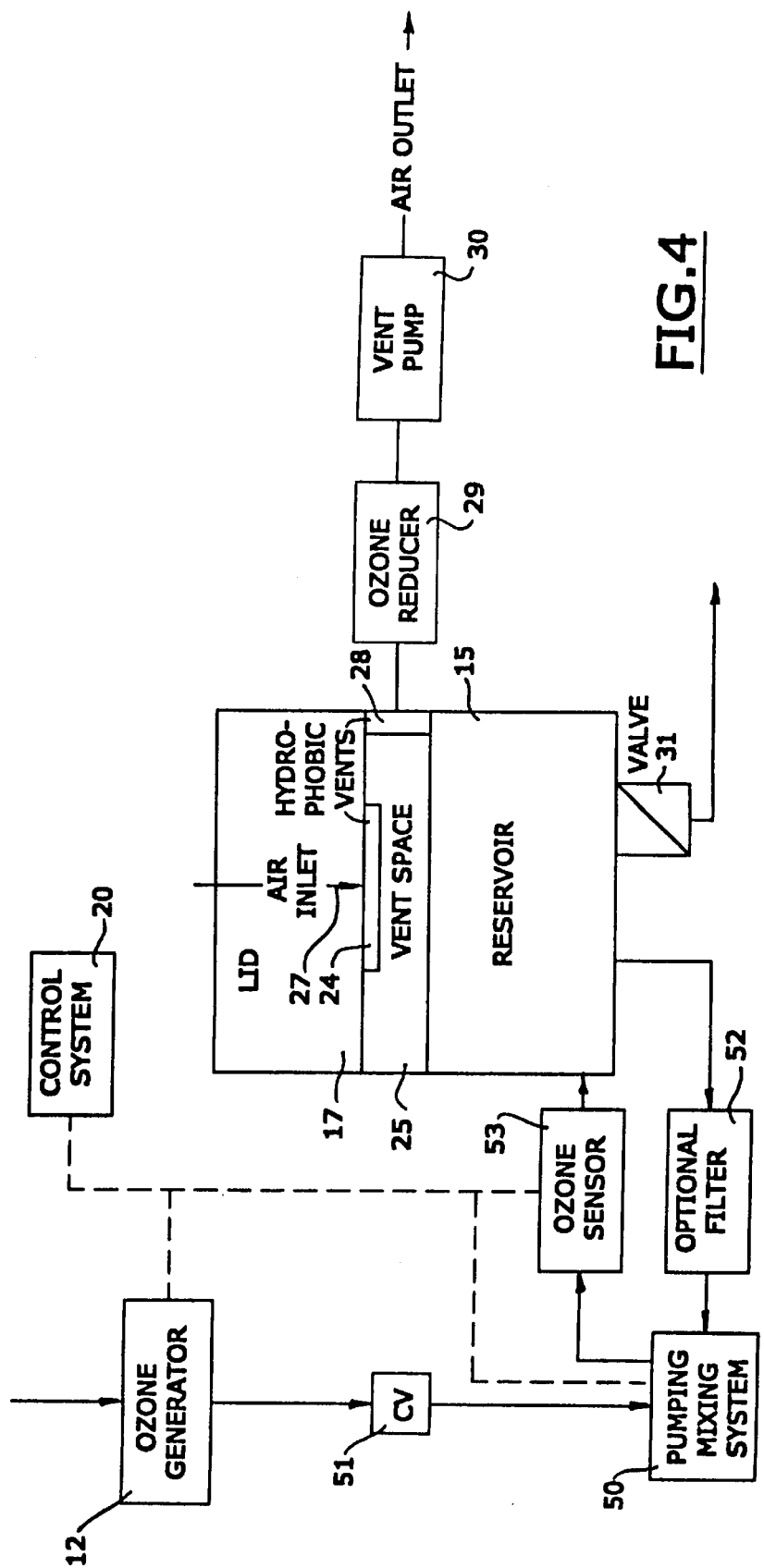
FIGS. 4 and 5 are schematic diagrams of other preferred embodiments of vented reservoir purifiers having circulation loops.
Figure 5:
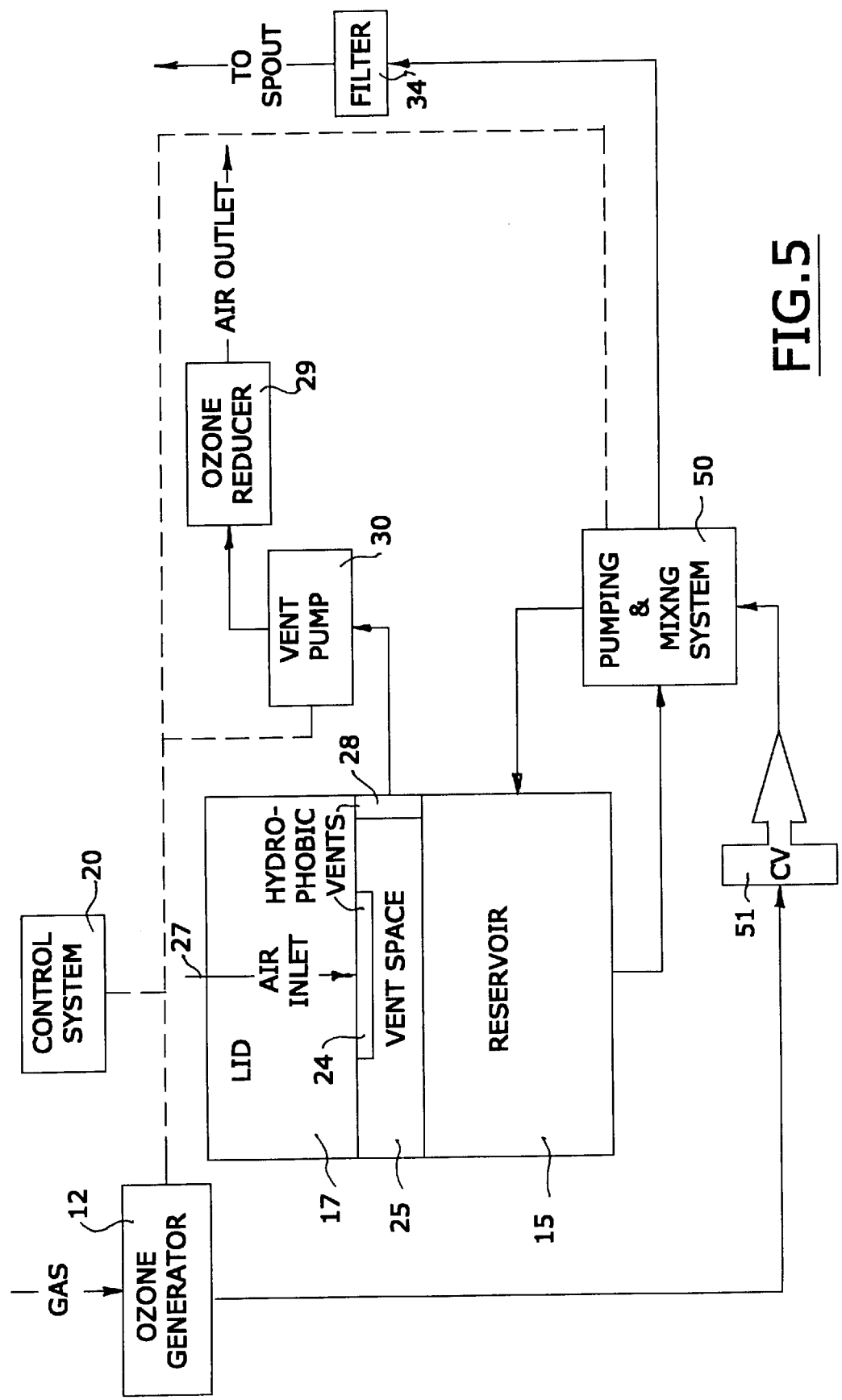

Purification of liquid in purifier 10 involves reservoir 15 in which liquid to be treated is deposited. Purification can occur solely within reservoir 15, as shown in the embodiments of FIGS. 1–3, or can involve circulation to and from reservoir 15, as shown in the embodiments of FIGS. 4 and 5. In all such embodiments, reservoir 15 has a vent space 25 above the level of liquid in reservoir 15. A vent pumping system, which can be arranged in several ways, as illustrated, exhausts ozone-containing gas from vent space 25.

Ozone-containing gas in vent space 25 comes from introduction of ozone-containing gas to reservoir 15. This occurs via diffuser 14 in the embodiments of FIGS. 1-3. Diffuser 14 bubbles the ozone-containing gas into liquid in reservoir 15 so that ozone dissolves in the liquid as bubbles rise through the liquid. A preferred form of diffuser is explained in U.S. Pat. No. 5,422,043. Bubbles bursting at the surface of liquid in reservoir 15 introduce ozone-containing gas into vent space 25.

A gas pump 13, preferably having a variable capacity, pumps ozone-containing gas through diffuser 14 and into the reservoir liquid. A variable capacity allows pump 13 to start up with an increased flow rate that clears liquid from pores in diffuser 14 and then operate at a lower flow rate suitable for delivering the ozone-containing gas. Ozone generator 12 produces ozone from oxygen in air that first passes through desiccant 11, which removes moisture from the air to improve the efficiency of generator 12. The ozone and air mixture produced by generator 12 is then pumped to diffuser 14 by gas pump 13.

To prolong the life of desiccant 11, a valve 16 is arranged upstream of desiccant 11 to block air from flowing into desiccant 11 except when gas pump 13 is operating. Valve 16 is normally closed and preferably has a closure bias that is overcome by pump 13.

A control system 20 controls operation of components of purifier 10. Broken lines indicate communication between control system 20 and the components being controlled. Of the components described so far, control system 20 communicates with and controls ozone generator 12 and gas pump 13.

Reservoir 15 is preferably closed by a lid 17 that affords user access to reservoir 15. This allows a user to fill reservoir 15 by opening lid 17 and to reach into reservoir 15 and clean reservoir 15 through the opening provided by lid 17.

Since vent space 25 accumulates some ozone during liquid purification, I prefer a vent pumping system to exhaust ozone from vent space 25. In the embodiment of FIG. 1, the vent pumping system includes vent pump 30 and ozone reducer 29. Exhausting ozone from vent space 25 has several advantages. It reduces the time delay for opening lid 17 after completion of a purification cycle, and it ensures that a user does not encounter a harmful amount of ozone.

Exhausted ozone is converted to oxygen in reducer 29 and harmlessly vented to ambient atmosphere by vent pump 30, which is in communication with control system 20. Vent pump 30 preferably operates for a time after completion of a purification cycle and after ozone generator 12 and gas pump 13 stop operating. This allows time to exhaust ozone from vent space 25.

Air bubbles bursting at the surface of liquid in reservoir 15 cause liquid droplet spattering that can make tiny liquid particles airborne. To prevent liquid from leaving reservoir 15 with exhaust gases, I prefer that a porous hydrophobic barrier 28 be arranged over an outlet leading to vent pump 30. Hydrophobic element 28 allows gas to pass through but blocks passage of any liquid, to keep a passageway open to vent pump 30, without allowing liquid escape. This improves over a mesh screen or baffles in the exhaust passageway.

Arranging vent pump 30 downstream of vent space 25 subjects vent space 25 to a negative or subatmospheric pressure. This has the advantage of allowing lid 17 to fit loosely over a reservoir opening and not require a leak-proof seal around lid 17. Any vent space leakage will move air into vent space 25 and will not allow ozone to leak out of vent space 25 into ambient atmosphere. Any air flowing into vent space 25 in response to the reduced pressure created by vent pump 30 adds to the amount of gas that vent pump 30 must pump. To keep the capacity of vent pump 30 as small as possible requires minimal leakage into vent space 25 around lid 17.

It is also possible, as illustrated in the embodiment of FIG. 1, to deliberately create an air inlet 27 to pass through a light enclosure 26 upon entering vent space 25. Within light enclosure 26 is a lamp 21 that illuminates reservoir 15 to make rising bubbles readily visible within reservoir 15. The lamp 21 is preferably controlled by system 20 to operate while ozone generator 12 and gas pump 13 are operating, to show the user that purifier 10 is working properly. Light enclosure 26 can be combined with lid 17. Inflowing air through inlet 27 is preferably arranged to cool illuminating lamp 21 within light enclosure 26. Besides cooling lamp 21, inlet air entering vent space 25 dilutes whatever ozone is present and facilitates the exhaust of ozone via reducer 29 and vent pump 30.

To keep an air inlet to vent space 25 from being clogged with liquid spatter droplets, I prefer that a porous hydrophobic barrier element 24 be arranged over the air inlet passageway. Water droplets spattering onto hydrophobic element 24 will not spread out and clog its porous air passageways, which will remain open to passage of inflowing air. This improves over a mesh screen or baffles in the air inlet passageway.

During a purification cycle, I prefer that reservoir lid 17 be locked closed for the protection of the user by a lock 37. This can be accomplished via control system 20, which can release lid 17 only after completion of a purification cycle and after sufficient venting of vent space 25. Many different forms of locks 37 can be arranged to prevent accidental opening of lid 17 when vent space 25 contains ozone.

A lid switch 38, also in communication with control system 20, actuates whenever lid 17 opens. This preferably resets a status for purifier 10 to assume that reservoir 15 contains impure liquid.

Prior to liquid in reservoir 15 being purified, a valve 31 closes a liquid outlet from reservoir 15 that leads toward a dispensing system. Downstream of valve 31 is a water sensor 32 and a water pump 33 that pumps purified liquid toward a dispensing outlet. A filter 34 is preferably arranged in the dispensing line and is illustrated downstream of water pump 33 for filtering any residues from purified liquid. Filter 34 needs changing before it becomes clogged, and purifier 10 preferably includes a signal lamp 54 that indicates to a user when it is time to change filter 34. This is determined by control system 20 which can reach such a determination in several ways. These include counting the total operating time of water pump 33 or counting purification cycles initiated by an operator actuating a purifying switch 35 to start purifier 10 operating.

When filter 34 needs changing, purifier 10 can be disabled from operation until filter 34 is actually changed. When this is done, it preferably actuates a filter reset switch 44 that allows purifier 10 to resume operation.

Downstream of filter 34 is preferably a movable dispensing spout 40 that dispenses purified liquid into a receptacle positioned to receive it. Spout 40 preferably can be pivoted or extended from a housing of purifier 10 to dispense purified liquid and otherwise be retracted into a housing of purifier 10. There are several ways that extension and retraction motions of spout 40 can be accommodated, and for this I prefer a flexible tube concealed within spout 40. Extension and retraction of spout 40 are schematically indicated by the double-headed arrow.

A discharge opening from spout 40 is preferably blocked by a valve 41 whenever liquid is not being dispensed. Valve 41 opens in response to dispensed liquid flow and otherwise closes spout 40 against intrusion from ambient microorganisms that might otherwise inhabit liquid residue within spout 40 and upstream components. Valve 41 can also reduce dribbling after pump 33 has stopped.

With spout 40 made extendible for dispensing purified liquid, I prefer a switch 42 actuated by extension of spout 40 to allow pump 33 to operate for dispensing liquid. Switch 42 prevents accidental liquid dispensing when spout 40 is not extended, since this could dribble liquid into or over a housing for purifier 10. With spout 40 extended to actuate switch 42, a user can operate pump 33 in the liquid dispensing system by actuating a pump switch 43. Alternatively, spout switch 42 can be arranged for automatically starting pump 33 for dispensing liquid as soon as spout 40 is moved to an extended position, and for automatically stopping pump 33 when spout 40 is retracted. The difference involves ergonomics of user operation.

Liquid sensor 32, which is preferably actuated during operation of dispenser pump 33, can determine by an absence of liquid that reservoir 15 has been drained. Shortly afterward, control system 20 shuts off water pump 33 so that it is not left running dry.

Purifier 10 preferably includes lamps for indicating some functions and conditions. For example, lamp 61 can indicate "power on"; lamp 62 can indicate running of vent pump 30; and lamp 63 can indicate completion of a purification cycle and readiness for dispensing via pump 33.

The embodiment of FIG. 2 is similar to the embodiment of FIG. 1 except for the reversed positions of vent pump 30 and ozone reducer 29, which is arranged downstream of vent pump 30. Vent pump 30, in the position illustrated in FIG. 2, must be able to withstand ozone in the gas being pumped. Otherwise, a downstream position for ozone reducer 29 may be quieter, more efficient, or more convenient.

The embodiment of FIG. 3 places vent pump 30 upstream of vent space 25. This produces a positive or superatmospheric pressure in vent space 25 as vent pump 30 pumps air into vent space 25. This dilutes any concentration of ozone in vent space 25 and also exhausts ozone-containing gas via ozone reducer 29. Such an arrangement requires a well-sealed reservoir lid 17 so that ozone does not leak into ambient atmosphere. Vent pump 30, in the position shown in FIG. 3, pumps only inlet air, which is preferably used for cooling an illumination lamp in enclosure 26, as previously described.

The purifier embodiments of FIGS. 4 and 5 differ by using a circulation loop to combine liquid with ozone-containing gas. Reservoir 15 still benefits from a vent space 25 and a vent pump 30, allowing reservoir access and exhausting ozone as explained above.

In the embodiment of FIG. 4, a liquid pump and mixer 50 for the circulation loop flows liquid from reservoir 15 into mixing contact with ozone-containing gas received from generator 12 via a check valve 51. A filter 52 can be included in the circulation loop, along with an ozone sensor 53. Pump 50 returns the liquid and ozone mixture to reservoir 15 so that circulating flow combines enough ozone with the liquid to purify all the liquid in reservoir 15.

The embodiment of FIG. 5 arranges a similar circulation loop so that pump 50 can also accomplish dispensing of purified liquid after completion of a purification cycle. This economizes on pumps but requires additional valving.

I claim:

1. In a batch liquid purifier combining an ozone generator producing ozone-containing gas, a reservoir for holding liquid during purification, and a pumping system operating during purification to pump the ozone-containing gas into contact with the liquid in the reservoir, an improvement comprising a vent pumping system arranged to exhaust air and ozone-containing gas from a vent space above the liquid in the reservoir, the vent pumping system accomplishing said exhaust by arranging a pump to flow gas through and out of the vent space.

2. The improvement of claim 1 wherein a pump for the vent pumping system is arranged downstream of the vent space and creates a subatmospheric pressure in the vent space.

3. The improvement of claim 1 arranged so that air flowing into the vent space enters the vent space through a porous element that is hydrophobic.

4. The improvement of claim 1 arranged so that gas flowing out from the vent space departs from the vent space through a porous element that is hydrophobic.

5. The improvement of claim 1 wherein the reservoir has an access opening large enough to permit cleaning the reservoir interior and including a closure lid arranged over the reservoir opening.

6. The improvement of claim 5 including a switch enabling operation of the purifier when the lid is closed.

7. The improvement of claim 5 including an indicator arranged for indicating completion of the purification process.

8. The improvement of claim 1 including a system for dispensing purified liquid from the reservoir.

9. The improvement of claim 8 including a filter for the liquid being dispensed and an indicator indicating a need for changing the filter.

10. The improvement of claim 9 wherein the indicator is responsive to an extent of operation of the purifier.

11. The improvement of claim 8 wherein the dispensing system includes a liquid pump controlled to reduce dry running time.

12. The improvement of claim 8 including a valve arranged in a dispensing outlet to close the outlet until the dispensing system is activated.

13. The improvement of claim 8 wherein the dispensing system includes a movable spout that can be extended beyond a housing of the purifier for dispensing purified liquid.

14. The improvement of claim 13 including a switch actuating the dispensing system upon extending the spout and deactivating the dispensing system upon retracting the spout.

15. The improvement of claim 13 including a switch blocking operation of the dispensing system unless the spout is extended.

16. The improvement of claim 8 arranged so that liquid access to the dispensing system is blocked at the reservoir to prevent untreated liquid from entering the dispensing system.

17. The improvement of claim 8 wherein the dispensing system is arranged for circulating liquid to and from the reservoir during purification.

18. The improvement of claim 17 arranged so that circulated liquid flows the ozone-containing gas into the reservoir.

19. The improvement of claim 1 wherein the reservoir includes a viewable light-transmitting portion accessible for cleaning and permitting viewing of bubbles rising in the reservoir.

20. The improvement of claim 1 including a pressure responsive valve arranged upstream of a desiccant arranged in an air inlet to the ozone generator to keep air from entering the desiccant except when the ozone generator is operating.

21. The improvement of claim 1 arranged so that the vent pumping system continues to pump for a period of time after pumping of the ozone-containing gas ceases.

22. The improvement of claim 1 including a variable pressure pumping means for the ozone-containing gas.

23. The improvement of claim 1 arranged so that gas from the vent space is delivered by the vent pumping system to an ozone reducing element and then to atmosphere.

24. The improvement of claim 1 arranged so that liquid is prevented from entering an air inlet and an air and ozone gas outlet from the vent space.

25. The improvement of claim 1 wherein a lid closes the vent space over the reservoir during operation of the vent pumping system.

26. The improvement of claim 25 including a lid lock device operable during a purification cycle.

27. The improvement of claim 25 arranged so that opening the lid resets the purifier to assume liquid in the reservoir is impure.

28. The improvement of claim 25 including an indicator activated after completion of a venting cycle for indicating that it is safe to open the lid.

29. The improvement of claim 1 arranged so that the reservoir is illuminated to make rising bubbles visible.

30. The improvement of claim 1 including a liquid circulating system communicating with the reservoir for circulating liquid during purification.

31. The improvement of claim 30 arranged so that the liquid circulating system flows the ozone-containing gas into the reservoir.

32. The improvement of claim 30 arranged so that the liquid circulating system flows purified liquid from the reservoir to a dispensing outlet upon completion of a purification cycle.

33. The improvement of claim 30 wherein the liquid circulating system includes a filter.

34. A system of venting a batch liquid reservoir during purification of the liquid by an ozone-containing gas pumped from an ozone generator into the reservoir, the system including:

a vent pumping system including a pump arranged downstream of a vent space above the liquid in the reservoir to exhaust ozone-containing gas from the vent space and maintain the vent space at a pressure less than atmospheric.

35. The system of claim 34 including a light illuminating bubbles rising in the reservoir.

36. The system of claim 34 arranged so that gas outflow from the vent pumping system is directed through an ozone-reducing element and then to atmosphere.

37. The system of claim 34 including an air inlet into the vent space.

38. The system of claim 37 arranged so that air flowing into the vent space cools a lamp illuminating bubbles rising in the reservoir.

39. The system of claim 37 including a barrier to prevent reservoir liquid from entering the air inlet.

40. The system of claim 34 arranged so that purified liquid is dispensed from the reservoir by moving a spout that can be extended beyond the housing of the purifier.

41. The system of claim 40 including a switch blocking dispensing unless the spout is extended.

42. The system of claim 34 including an indicator responsive to a measure of purifier operation to indicate a need for changing a filter for the dispensed purified liquid.

43. The system of claim 34 arranged so that inflow of air to a desiccant in an air inlet to the ozone generator is blocked except when liquid is being purified.

44. The system of claim 34 including a barrier preventing liquid from leaving the vent space with out-flowing gas.

45. The system of claim 34 including a reservoir lid closing the vent space over the liquid.

46. The system of claim 45 including a lid lock device operable during a purification cycle.

47. The system of claim 45 arranged so that opening the lid resets the purifier to assume liquid in the reservoir is impure.

48. The system of claim 45 arranged so that the vent pumping system operates after completion of pumping ozone gas into the reservoir.

49. The system of claim 48 including an indicator indicating that it is safe to open the lid.

50. The system of claim 34 including an indicator indicating completion of the pumping of ozone-containing gas into the reservoir.

51. The system of claim 34 including a barrier arranged in a liquid outlet from the reservoir to prevent liquid from entering a dispensing system for purified liquid before the dispensing system is actuated.

52. The system of claim 34 including liquid circulation from and to the reservoir during purification.

53. The system of claim 52 including a filter for liquid circulating from and to the reservoir.

54. The system of claim 52 arranged so that circulating liquid flows ozone-containing gas into the reservoir.

55. The system of claim 52 a ranged so that purified liquid is dispensed via a path for liquid circulation.

56. A method of purifying a batch of liquid in a reservoir by means of an ozone-containing gas pumped from an ozone generator into contact with the liquid in the reservoir, the method including:

a. withdrawing ozone-containing gas from a vent space above the liquid in the reservoir by admitting air to the vent space and exhausting air and ozone-containing gas from the vent space;

b. closing the vent space with a reservoir lid that can be opened to provide access to the reservoir; and c. preventing liquid from entering a purified liquid dispensing system until the purified liquid dispensing system is operated.

57. The method of claim 56 including illuminating bubbles rising in the reservoir while the liquid is being purified.

58. The method of claim 56 wherein the purified liquid dispensing system includes a movable dispensing spout and a switch blocking dispensing system operation unless the spout is moved to extend from a housing of the purifier.

59. The method of claim 56 including blocking any outflow of liquid with the gas flowing out from the vent space.

60. The method of claim 56 including dispensing purified liquid from the reservoir by moving a spout to extend from a housing of the purifier.

61. The method of claim 60 including closing the dispensing outlet except when liquid is being dispensed.

62. The method of claim 56 including using a measure of purifier operation to indicate a need for changing a filter for the dispensed liquid.

63. The method of claim 56 including using air admitted to the vent space to cool a lamp illuminating bubbles rising in the reservoir.

64. The method of claim 63 including blocking liquid from entering an inlet for the admitted air.

65. The method of claim 56 including maintaining a subatmospheric pressure in the vent space while gas is being withdrawn from the vent space.

66. The method of claim 56 including continuing to withdraw gas from the vent space after completion of the pumping of an ozone-containing gas into the reservoir.

67. The method of claim 66 including indicating to an operator that it is safe to open the reservoir.

68. The method of claim 56 including circulating liquid from and to the reservoir during purification.

69. The method of claim 68 including filtering circulating liquid.

70. The method of claim 68 including using circulating liquid to flow the ozone-containing gas into the reservoir.

71. The method of claim 68 including dispensing purified liquid via a path for the circulating liquid.

* * * * *